United States Patent
Atwell et al.

(10) Patent No.: US 7,062,168 B1
(45) Date of Patent: Jun. 13, 2006

(54) BIFURCATED RANGE STAGES TO INCREASE SPEED OR DYNAMIC RANGE OF MEASURING INSTRUMENTS AND ASSOCIATED METHODS

(75) Inventors: Michael Paul Atwell, Broadview Heights, OH (US); Michael Paul Minneman, Broomfield, CO (US); Elwood James Egerton, Longmont, CO (US)

(73) Assignee: DBM Optics, Incorporated, Lafayette, CO (US)

( * ) Notice: Subject to any disclaimer, the term of this patent is extended or adjusted under 35 U.S.C. 154(b) by 855 days.

(21) Appl. No.: 10/102,025

(22) Filed: Mar. 19, 2002

Related U.S. Application Data

(60) Provisional application No. 60/277,348, filed on Mar. 19, 2001.

(51) Int. Cl.
*H04B 10/08* (2006.01)

(52) U.S. Cl. .......................... 398/38; 398/33; 398/202; 398/208; 398/214; 356/226; 356/229; 250/214 A; 324/115; 330/129; 341/139

(58) Field of Classification Search ................ 324/115; 330/129; 356/223, 73.1, 226, 229; 341/139; 398/33, 38, 202, 208, 214; 250/214 A
See application file for complete search history.

(56) References Cited

U.S. PATENT DOCUMENTS

| | | | | |
|---|---|---|---|---|
| 4,329,641 A | * | 5/1982 | Ikeda et al. | 324/115 |
| 4,433,914 A | * | 2/1984 | Curran | 356/223 |
| 4,774,474 A | * | 9/1988 | Beauducel et al. | 330/129 |
| 4,990,913 A | * | 2/1991 | Beauducel | 341/139 |
| 5,491,548 A | * | 2/1996 | Bell et al. | 356/73.1 |
| 5,825,516 A | | 10/1998 | Walsh | |

* cited by examiner

*Primary Examiner*—Hanh Phan
(74) *Attorney, Agent, or Firm*—Renner, Otto, Boisselle & Sklar, LLP

(57) ABSTRACT

Multiple stage ranging circuitry for a measuring circuit includes a first ranging circuit that selectively amplifies an input signal by respective amounts according to the magnitude of the input signal thereto, and a second ranging circuit coupled to the output of the first ranging circuit selectively amplifies the output signal from the first ranging circuit by a respective amount according to the magnitude of that output signal to provide a measured output. The multiple stage ranging circuitry increases dynamic range and provides for high speed measurements over that dynamic range.

A method of ranging for high speed signal measurements over a wide dynamic range includes directing an input signal to a first ranging stage that responds at one speed to set ranging over a relatively wide variation in input signal magnitudes, and directing the output signal from the first ranging stage to a second ranging stage responsive at a second speed faster than the one speed to set ranging over a relatively narrower range of signal magnitudes to provide for signal measurement.

31 Claims, 5 Drawing Sheets

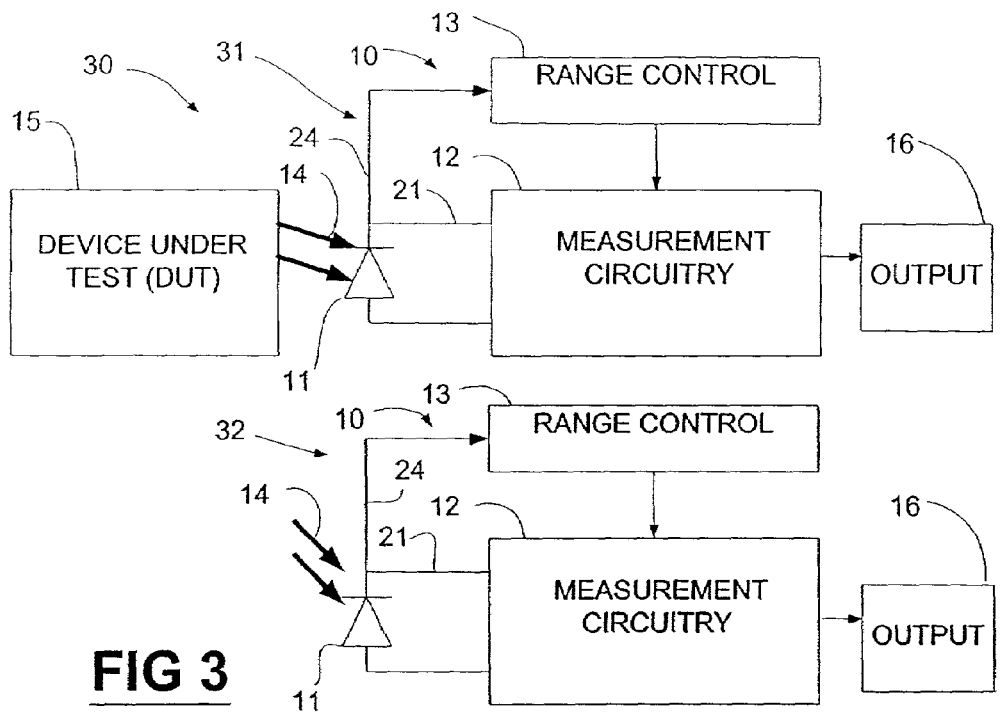
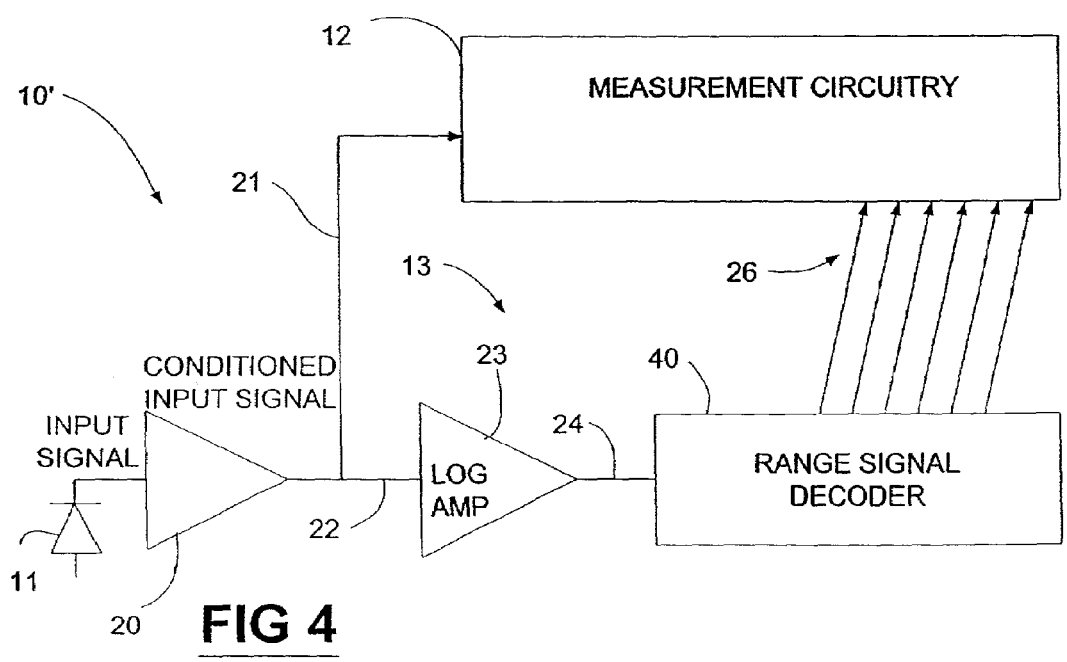

BIFURCATED RANGE STAGES TO INCREASE SPEED OR DYNAMIC RANGE OF MEASURING INSTRUMENTS AND ASSOCIATED METHODS

CROSS-REFERENCE TO RELATED APPLICATIONS

This application claims the benefit of U.S. Provisional Application Ser. No. 60/277,348, filed Mar. 19, 2001.

TECHNICAL FIELD

This invention relates generally, as indicated, to multiple stage ranging for measurement devices, and, more particularly, to apparatus and method employing multiple stage ranging for obtaining high speed, accurate signal measurements over a wide range of magnitudes. The invention also relates to bifurcated range stages to increase speed or dynamic range of measuring instruments and associated methods.

BACKGROUND

As the use of optical signals continues to increase and the speeds of equipment employing optical signals also increase, improved fast and accurate measurement techniques are needed. Optical signal carriers, such as fiber optic cable, and various connecting, switching, amplifying, and detecting devices require testing. As a present example of measuring speed, in some test instruments measurements are made at the rate of ten thousand or more per second.

An example of an optical test instrument, namely, an optical power meter for detecting loss factors in fiber optic communications, is described in U.S. Pat. No. 5,825,516.

An example of a device to be tested is that known as the Telecom DWDM system, that relies on deep optical filter components, which often reject at 25 dB to 50 dB and more, clearly a rather wide range. In other optical instruments signal strengths vary over an even wider range, e.g., between approximately −7 dB and approximately −45 dB. Validating performance of such devices may be performed using a tunable laser source and an optical power meter. However, conventional test systems, which include an optical power meter and associated measurement instrument, usually are generally linear-ranging instruments, and the range typically changes over three (3) to five (5) ranges, e.g., decades, as signals between 25 dB and 40 dB, for example, are measured. Usually it is desirable for a signal to be measured in the proper range setting of a measurement instrument to obtain the most accurate measurement. For example, usually it is undesirable to measure a small magnitude signal at an upper range of a multiple range measurement instrument because accuracy and resolution would be rather poor; similarly a large magnitude signal would not be measured at a low rage because the likely would be off-scale, as is well known. In conventional linear-ranging test systems although accurate measurements can be obtained, the time it takes to determine the correct range and to switch to that range can be a major component of the time required to perform the test and, thus, slows down the overall measurement procedure.

In conventional linear ranging measurement circuitry and in software ranging measurement circuitry, usually time is wasted determining the range in which the measurement circuitry should operate to measure signal strength of a given input signal. In a typical case the measurement circuitry measures the input signal using one range, usually that one range is whatever range was used for the last measurement made. The circuitry determines whether the signal is over range, i.e., larger than the measurement circuitry is able to measure while in the present range, and in such case, the ranging mechanism must select a higher range. Similarly, if the measurement demonstrates that the measured signal is below a prescribed level or percent of the signals typically measured in the present range of the measurement circuitry, e.g., below 10% of the largest signals measured at the present range, then a lower range must be selected. After selecting the new range, another measurement is made. If that measurement is in range, the measurement result is acceptable; but if that measurement shows the measured signal is above or below range, as was mentioned before, the range selection step must be repeated until an acceptable range is identified. To make a measurement in a new range, the measurement circuitry must "settle" so that the measurement circuitry is set with the newly selected range of measurement capability. Thus, total measurement time is the settling time times the number of range changes required to reach the proper range, plus the measurement time times the number of range changes. Accordingly, it is desirable to expedite the adjustments in measurement circuitry to reduce the time required for selecting range.

Measurements made using linear range measurement instruments are relatively accurate; but, as ranges must be changed, depending on the magnitude (or signal strength) of the measured signal, operation of such instruments may be relatively slow. Accordingly, there is a need to increase the speed of making such measurements.

In making measurements of signals that vary in magnitude over a relatively wide range, non-linear measurement systems, which include nonlinear amplifiers, sometimes have been used. An example of a non-linear amplifier is a logarithmic amplifier. A logarithmic amplifier based measurement instrument may be relatively faster than the linear ranging instruments mentioned above, because ranges do not have to be switched, or at least the number of switched ranges is fewer than for a linear ranging measurement instrument. However, logarithmic amplifiers compress the results of the measurement, which leads to a reduction in accuracy of the measurement, especially when measuring relatively smaller signals in the large range over which a signal magnitude or signal strength may vary. Accordingly, there is a need to improve the accuracy of such measurements.

Linear ranging measurement devices tend to be more sensitive and/or accurate than non-linear measurement devices; and non-linear measurement devices tend to be faster than linear ranging measurement devices. There is a need for increasing the speed of making measurement while maintaining a high level of sensitivity and accuracy.

The dynamic range of a measuring instrument having multiple ranges depends on the ranges. As the number of ranges increase and or the span of respective ranges increases, a reduction in speed and/or accuracy may occur due to the time constants in the ranging and/or measurement circuits. For example, the signal input or source has characteristic resistance and capacitance, which provides an "input time constant;" and the respective parts, e.g., amplifiers, of the ranging circuitry have respective characteristic resistance and capacitance, which also provides a time constant. The different ranging subcircuits in the ranging circuitry may have different respective time constants, which makes compensation for those differences as ranges change difficult, if not impossible. Absent compensation for the time constants, measurements may be taken of signals before a signal has stabilized, for example. Thus, there is a need to increase the speed of measurements made over relatively wide ranges. Likewise, there is a need to increase the dynamic range over which measurements can be made relatively fast.

Stated another way, a speed and accuracy limiting factor on high speed measurements is the time constants due to the source or input resistance and capacitance and the resistance and capacitance of respective amplifiers in the measuring and/or ranging circuitry. Due to such time constants, signals may not be adequately stable or formed for accurate high speed measurement thereof as the signals vary and/or as ranges are changed. Thus, there is a need to maintain accuracy and speed of such measurements.

SUMMARY

Briefly, according to an aspect of the invention, multiple stage ranging circuitry for measurement instruments has a stage to handle a relatively wide variations in input signals and another stage to handle a relatively narrow variation in input signals, the speed of operation of the latter stage being faster than the speed of operation of the former stage.

Briefly, according to an aspect of the invention, multiple stage ranging circuitry for measurement instruments has a stage to handle a relatively wide variations in input signals and another stage to handle a relatively narrow variation in input signals to increase dynamic range of the measurement instrument.

According to another aspect, a measuring circuit includes a first ranging circuit that selectively amplifies an input signal by a respective amount according to a prescribed input, and a second ranging circuit that selectively amplifies an input signal by a respective amount according to a prescribed input.

According to another aspect, a method of ranging for signals includes directing an input signal to a first ranging stage which is responsive at one speed to set ranging over a relatively wide variation in input sign magnitudes, and directing a signal representative of an output from the first ranging stage to a second ranging stage that is responsive at a second speed faster than the one speed to set ranging over a relatively narrower range of signal magnitudes.

According to another aspect, a method of increasing the dynamic range of meter ranging circuitry includes directing an input signal to a first ranging stage which selects respective ranges over a relatively wide variation in input signal magnitudes, and directing a signal representative of an output from the first ranging stage to a further ranging stage to set ranging over a relatively narrower range of signal magnitudes.

According to another aspect of the present invention a non-linear amplifier drives linear ranging circuitry in a measurement instrument.

According to another aspect a non-linear ranging device is used to control a linear ranging device.

According to another aspect, one stage of a multiple stage ranging circuit is controlled by a comparator circuit.

According to another aspect, a non-linear amplifier circuit and a linear optical power meter are cooperative in response to an input signal such that the non-linear amplifier circuit drives linear ranging circuitry of the optical power meter to set the linear measuring range thereof.

Another aspect relates to quickly and accurately measuring signals of the type wherein the signal strength varies over a wide range.

Another aspect is to provide a wide dynamic range for measurement circuitry.

Another aspect is to measure signals of the type wherein the signal strength may vary over a wide range of on the order of 50 dB, wherein accurate measurements can be obtained for small and large signals, and wherein the measurements can be made relatively fast.

Another aspect relates to apparatus for measuring signals over a large range, including measurement circuitry to measure signals, the measurement circuitry having multiple rage stages, each including a number of respective range determinative amplifiers and a range selector.

Another aspect relates to an optical power meter, including measurement circuitry for measuring electrical signals representative of detected light over a wide range of optical power, including ranging circuitry arranged in a number of stages to determine respective ranges of the optical power measured, and respective selectors in parallel with the ranging or measurement circuitry to control operation of the ranging circuitry to select the measuring range of the measurement circuitry in response to magnitude of signals provided the respective stages.

Another aspect ret to a range selector for measurement circuitry useful to measure inputs having a wide range of variation over a number of orders of magnitude, including a non-linear amplifier providing an output in response to an input representative of a signal to be measured, and range section circuits responsive to the non-linear amplifier to provide range selection signals for use to select operating range of such measurement circuitry.

Another aspect relates to a high speed range selector for optical power measuring apparatus including measurement circuitry having ranging circuitry and operable to measure signals over a number of ranges, characterized in that the ranging circuitry includes a number of stages, one having a larger range than the other, and the other being faster than the one.

A number of features are described herein with respect to embodiments of the invention; it will be appreciated that features described with respect to a given embodiment also may be employed in connection with other embodiments.

The invention comprises the features described herein, including the description, the annexed drawings, and, if appended, the claims which set forth in detail certain illustrative embodiments. These embodiments are indicative, however, of but a few of the various ways in which the principles of the invention may be employed.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

BRIEF DESCRIPTION OF THE DRAWINGS

In the annexed drawings:

FIG. 3 is a schematic illustration of an optical testing instrument including a number of optical power meters according to an embodiment of the invention;

FIG. 4 is a schematic circuit diagram, similar to FIG. 2, showing a generic range signal decoder to provide range signals to the measurement circuitry in response to the output from a non-linear amplifier;

DESCRIPTION

Figure 1:
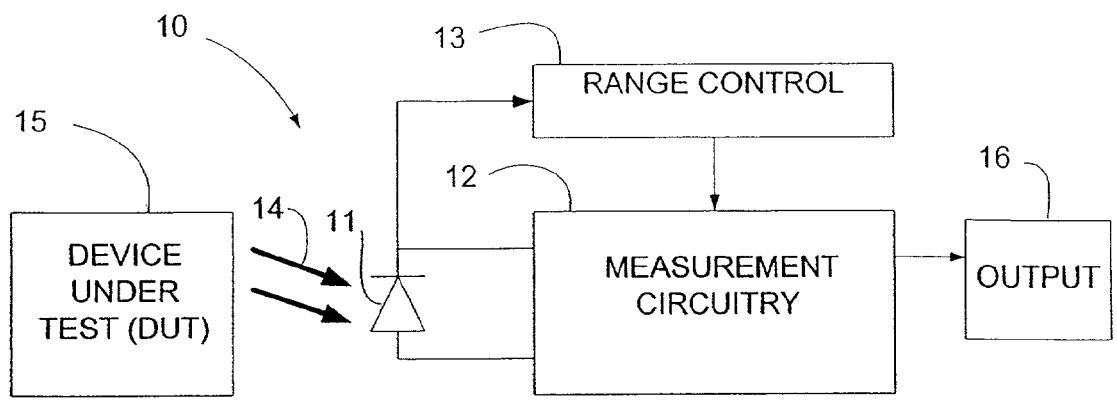
FIG. 1 is a schematic illustration of measurement circuitry according to an embodiment of the invention.

Referring in detail to the drawings, wherein like reference numerals designate like parts in the several figures, and initially to FIG. 1, an optical power meter and measurement circuitry according to the invention is generally indicated at 10. The optical power meter and measurement circuitry 10 includes a light detector 11, measurement circuitry 12 and range selection circuit 13. The optical power meter and measurement circuitry 10 measures light 14 received from a device under test 15 (DUT).

The device under test may be any of a variety of devices in which optical signals are used, developed, conducted, switched, etc. The device under test may be a fiber optic device, such as a fiber optic cable, individual optical fiber, multiplexer, optical switch or cross connect device, or other optical source, optical device, and/or optical communication device, system or component or communication to, in and/or from another computing device. The light 14 provided by the device under test 15 for measurement by the optical power meter and measurement circuitry 10 may be a single wavelength, more than one wavelength, etc., and may be in a narrow or broad spectrum range, for example, in the visible range, in a range that is other than visible, or in a range that is partly visible and/or partly other than visible, etc.

The range selection circuit 13 is coupled to the detector 11 and in parallel relation to the measurement circuitry 12 to set the range of the measurement circuitry according to the magnitude of the light signal detected by the detector 11. As was mentioned, it is antics that the signal strength of the light signal may vary over a wide range, and the cooperative relation of the measurement circuitry 12 and the range selection circuit 13, which receive the conditioned signal that is proportionally representative of the light signal, allows for fast, accurate measurement of the light signal. Accordingly, the range selection circuit 13 is a nonlinear circuit able to respond to a wide range of sigal strengths detected by the detector 11 and to set the measuring range of the linear-ranging measurement circuitry 12 allowing the measurement circuitry to maintain good sensitivity while measuring signals with good accuracy, as is described in further detail below with respect to FIG. 2.

Output device 16 may be used for several purposes. One example, is a meter that displays the signal strength values measured by the measurement circuitry 12 or some other values measured by the measurement circuitry. The output 16 may be a computer that stores, uses and/or analyzes data from the measurement circuitry. The output 16 may be a display, such as a liquid crystal display, cathode ray tube display, or other display that displays the data graphically, numerically or both. The output 16 may take other forms, too, as is known in the art and may be developed in the future.

The present invention utilizes a non-linear amplifier described further below and associated circuitry configured to directly drive linear ranging circuitry in the measure circuitry 12. This arrangement allows the optical power meter to change ranges relatively fast, for example, as fast as one (1) ties the hardware settling time. Using the non-linear range selection circuit 13 in parallel with the linear-ranging measurement circuitry 12 to select the linear ranging thereof, ranging happens in real time. Therefore, the sometimes long cycles required for range setting using convent software based ranging or using exclusively linear hardware ranging approaches are not encountered.

Figure 2:
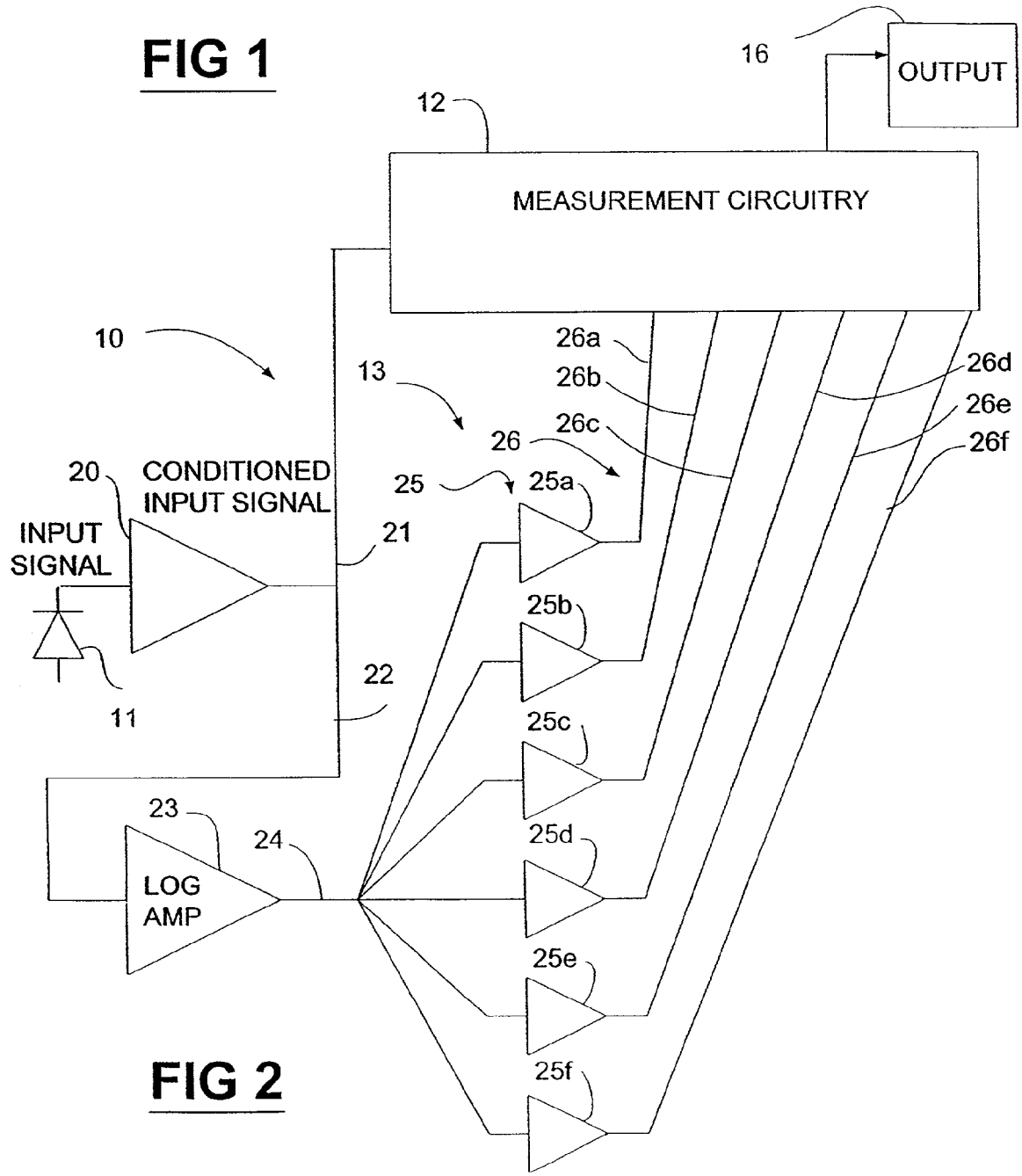
FIG. 2 is a schematic circuit diagram that provides non-linear ranging to control a linear ranging measurement device according to the invention illustrated in FIG. 1, for example.

The range selection circuit 13 is illustrates in greater detail in FIG. 2 in the optical power meter and measurement circuitry 10. An input signal in the form of light 14 (FIG. 1) impinging on the detector 11 causes an electrical signal produced by the detector. The electrical signal from the detector 11 is conditioned by an appropriate amplifier or pre-amplifier circuit 20 and is provided by lines 21, 22 as an input signal, which is proportionally of the light signal strength, simultaneously to the parallel connected measurement circuitry 12 and the range selection circuitry 13. The measurement circuitry 12 and the range selection circuit 13 are conned in parallel, which contributes to the increased speed of the range selecting function and making of measurements, compared to prior ranging systems.

The measurement circuitry 12 may be conventional measurement circuitry for the signals intended to be measured by the optical power meter and measurement circuitry 10. Several examples of such measurement circuitry are mentioned above, and others also exist. In an embodiment of the present invention the measurement circuitry is of the type which includes linear ranging capability to obtain good accuracy in the measurements, for example, compared to some measurement circuitry that use non-linear measurement techniques, which may have reduced accuracy at certain signal ranges, for example, at lower signal strengths.

In the range selection circuit 13 illustrated, the non-linear amplifier 23 is a logarithmic amplifier. The logarithmic amplifier 23 receives the conditioned input signal on line 22 and provides its output on line 24 as an input to a number of parallel connected comparators 25a–25f (collectively designated by reference numeral 25).

The respective outputs 26a–26f (collectively referred to as output 26) from each of the comparators 25 are coupled to the measurement circuitry 12 to select the range of the measurement circuitry. The range can be selected by an appropriate logic circuit in the measurement circuitry 12. The range can be selected using appropriate analog or digital circuitry able to respond to the output from the non-linear amplifier 23 to provide to the measurement circuitry 12 a signal of the type to which the linear-ranging circuitry thereof can respond. The range may be selected by software that responds to a digital word composed by signals on the outputs 26 from the comparators 25. In any event, though, the outputs from the comparators 25 in effect are range selection signals that determine the range setting of the met circuitry 12 to measure the signal then being detected by the detector 11. The number of comparators 25 and/or their arrangement along with logic decoding circuitry, software or the like may be coordinated with the number of different ranges that can be selected in the measurement circuitry 12.

In an exemplary embodiment of the invention, the conditioned input signal provided by the detector 11 and pre-amplifier 20 to the lines 21–22 may vary over several orders of magnitude, for example five or six, say, from on the order of about 1 to about 100,000 or even 1,000,000, or still greater. The logarithmic amplifier 23 may in effect compress the input signal thereto, which varies over a range of 1 to 100,000, so that the output signal therefom varies over a range of, for example, 1 to 50. The output signal from the logarithmic amplifier 23 triggers respective comparators to switch the range of the measurement circuitry at decade intervals (or at some other intervals, as may be desired). Thus, for example, only the comparator 25*a* may be triggered to produce a prescribed output when the output from the logarithmic amplifier 23 is below (or perhaps is either at or below) a prescribed magnitude, such as, for example, 10% of the maximum output from the logarithmic amplifier. The other comparators 25*b*–25*f* would be triggered at different respective percentages of the maximum output signal from the logarithmic amplifier 23. The output signal from the logarithmic amplifier would be representative of the signal to be measured, e.g., the output from the pre-amplifier 20 or the light signal impinging on the detector 11.

In an exemplary embodiment the number of comparators that are triggered will represent and determine the range setting for the measurement circuitry 12. Alternatively, if the comparators are set up so only one comparator would be triggered exclusively, then that sole comparator would be the controlling factor for setting the range in the measurement circuitry 12.

As will be appreciated, the comparators 25 may be set up to provide a prescribed output when the magnitude of the logarithmic amplifier 23 (or other non-linear device) provides an output that is a given value or a given range of values. The comparators 25 may be set up so that when the signal to be measured is within one range only a single comparator provides the prescribed output to set the range of the measurement circuit 12 and when the signal to be measured is in a different range only a different single comparator provides the prescribed output. Alternatively, the comparators may be set up so that for one or more of the ranges several comparators provide the prescribed output to set the range of the measurement circuitry.

It also will be appreciated that although the invention is disclosed using comparators 25 to respond to the output form the non-linear amplifier 23 (or other non-linear device), other devices, such as logic circuits, threshold detecting circuits, digital voltmeters, or other analog or digital devices or circuits may be used to respond to the non-linear device to provide an input to the measurement circuitry 12 to set the range thereof.

Although the range selecting circuit 13 is illustrated and described with respect to a logarithmic amplifier 23, it will be appreciated that the amplifier 23 may be another non-linear device. Such non-linear device is able to respond to the input signal, to compress that input signal and to provide appropriate inputs to the comparators 25 so they can operate to cause the measurement circuitry to select the appropriate range for measuring the input signal.

The optical power meter and measurement circuitry 10 operates in relatively short time to select the range of the measurement circuitry 12 and to measure the input signal. The amplifier 23, whether logarithmic or otherwise non-linear, compresses the range of its input signal so the comparators can be set to operate in parallel easily and promptly to trigger and thereby to set the range of the measurement circuitry 12 so accurate and prompt measurement can be made of the input signal.

For convenience, measurement circuitry 12 may include ranging in respective decades, as is conventional, or the ranging my be in other increments. Therefore the amplifier 23 and comparators 25 are coordinated to affect, select, control or adjust the ranging circuitry in the circuitry 12 at respective decades in accordance with the signal strength of the input signal detected by the detector 11. In a sense the range selection circuit 13 uses the non-linear function of the amplifier 23 to compress the dynamic range of the measured signal and to control the measurement circuitry so that the measured signal is measured at an appropriate range setting of the measurement circuitry. Thus, the combination of the non-linear range selection circuitry 13 to select the measuring range of a linear-ranging measurement circuitry 12 in effect improves the dynamic range of the optical power meter and measurement circuitry 10. The ranges of the measurement circuitry may be substantially linear or in any event may be relatively linear ranges compared, for example, to those ranges encountered in non-linear measuring instruments, such as logarithmic measuring instruments or the like.

Thus, the linear ranging effected in the measurement circuitry 12 by the range selection circuit 13 allows for fast, accurate measuring of input signals that vary over wide ranges.

Briefly referring to FIG. 3, an optical testing apparatus 30 is illustrated. The optical testing apparatus has a number of measuring channels 31, 32 for measuring simultaneously or substantially simultaneously light 14 from different respective optical channels of the device under test 15 or light from different optical devices, etc. Although only two measuring channels are illustrated, it will be appreciated that there may be more than two channels. Each measuring channel includes an optical power meter and measurement circuitry 10 of the type described herein, which function as was described above. Although the outputs 16 are shown separately for each measuring channel, it will be appreciated that the output data may be combined for several of the measuring channels for use in data analysis by a computer, storage, graphical display, comparison, or other purpose.

Briefly referring to FIG. 4, a modified optical power meter and measurement circuitry 10' is illustrated. In this embodiment a range signal decoder 40 is used to respond to the output from the non-linear device 23 (here illustrated as a logarithmic amplifier). The range signal decoder 40 responds to or decodes the output from the logarithmic amplifier and provides a direct input to the linear-ranging circuitry in the measurement circuitry to select the operational range of the measurement circuitry to obtain an accurate measurement of the input signal. It will be appreciated that the range signal decoder 34 may be any of a number of devices, for example, comparators as were described above, analog or digital logic circuitry, a computer for decoding the output from the logarithmic amplifier 23 to provide the range selection for the measurement circuitry, etc.

Figure 5:
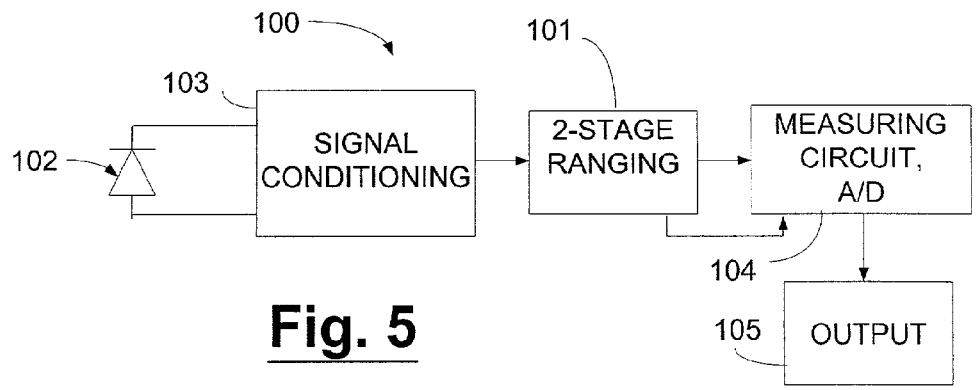
FIG. 5 is a schematic block diagram illustration of an embodiment of the invention using multiple stage ranging circuitry.

Turning to FIG. 5, a sign measuring system 100 including a multiple stage ranging circuitry 101 is illustrated. The system 100 includes an input 102, a signal conditioning circuit 103, the multiple stage ranging circuitry exemplified as a two (2) stage ranging circuit (referred to below for convenience as "2-stage ranging circuit" or "circuitry"), measuring circuit and analog to digital (A/D) 104 and output 105. The output 105 may be the same as or similar to the output 16 described above. The input 102 may be, for example, a photosensitive diode or some other device that provides an input signal to the signal conditioning circuit 103. If light is to be measured by the signal measuring system 100, the input 102 may be a photosensitive diode. If some other parameter is to be measured, the input 102 may be some other sensor or the like. The signal conditioning circuit 103 may be a conventional pre-amplifier or some other signal conditioning device used in measurement instruments.

The two stage ranging circuitry 101, which is described in greater detail below, receives an input signal from the signal conditioning circuit 103 and/or input device 102, adjusts the range for amplification and/or measurement of that input signal, and delivers the signal and/or range setting adjustments to the measuring circuit, A/D 104. The measuring circuit, A/D 104 measures the signal provided it and delivers to the output 105 information representative of that measurement for display, recording or other use.

Figure 6:
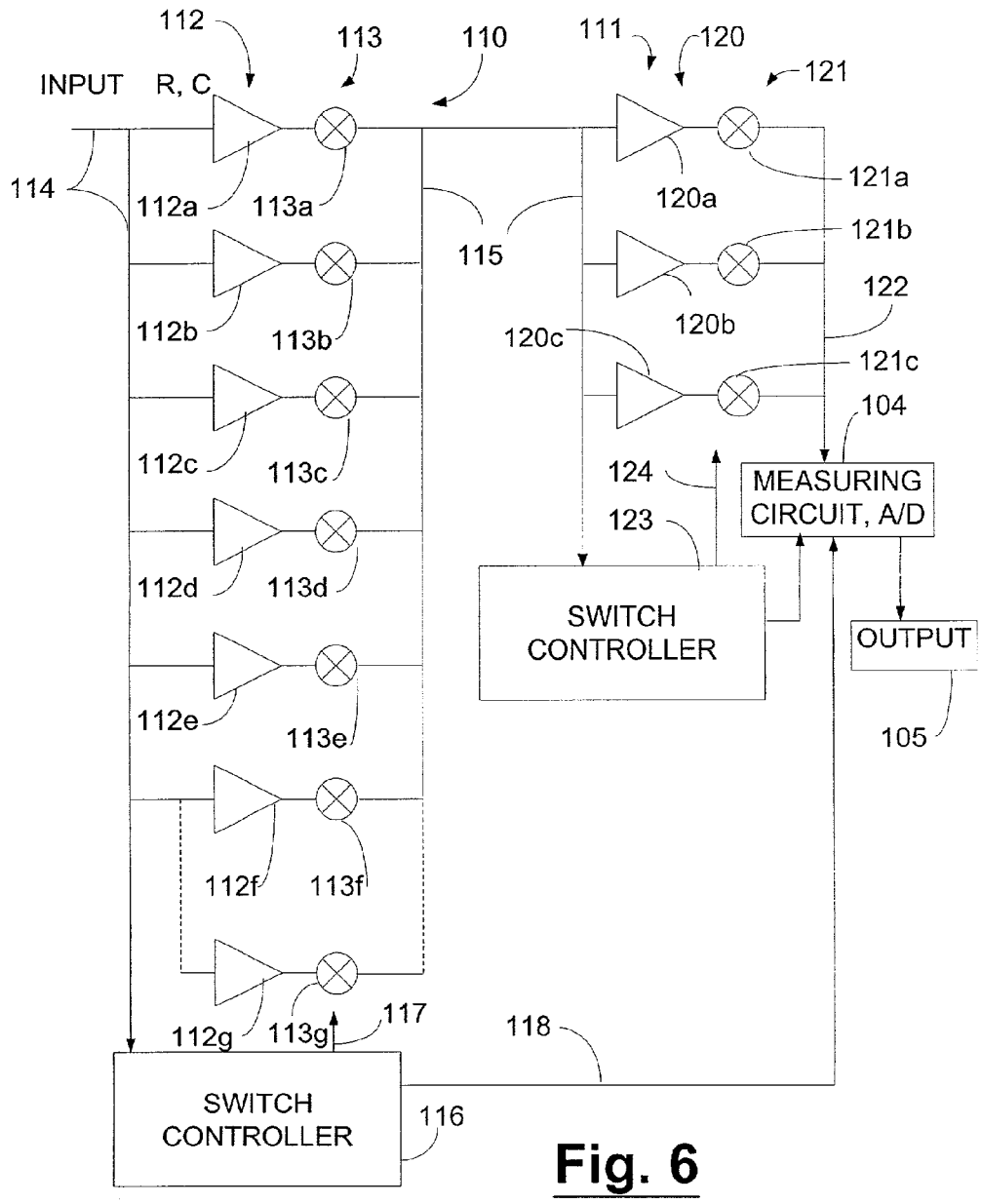
FIG. 6 is a schematic circuit diagram and block diagram illustrating more details of the multiple stage ranging circuitry of FIG. 5.

Turning to FIG. 6, portions of the signal measuring system 100, including the 2-stage ranging circuitry 101, which has a first stage 110 and a second stage 111, are shown in greater detail. The first stage 110 of the 2-stage ranging circuitry 101 includes a number of amplifiers, each having a different gain, such as, for example, x1, x10, x100, x1000, x10000, x100000, and 1000000 or more. In the illustrated embodiment of FIG. 6, there are seven such amplifiers 112a–112g (collectively referred to by reference 112) in the first stage 110, although there may be more or fewer amplifiers; and the gain of the respective amplifiers may be different than presented in this example. The amplifiers 112 are connected by respective switches 113a–113g (collectively referred to by reference number 113) as respective amplification or range setting channels in parallel between an input 114 and an output 115. The input 114 may be from the signal conditioning circuit 103 and/or input device 102; and the output 115 may be coupled to the measuring circuit, A/D 104.

A switch controller 116 controls operation of the switches 113 based on a prescribed input to the switch controller. For example, the switch controller 116 is coupled to the input 114 to sense the magnitude or other characteristic of the signal thereon as the prescribed input, and based on that sensing the switch controller operates via one of its outputs 117 to turn on (or off) respective switches 113 to couple a respective amplifier 112 in circuit between input 114 and output 115, thus setting the range of the first sage 110. Another output 118 from the switch controller 116 is coupled to the measuring circuit, A/D 104 to indicate the range at which the first stage 110 is set.

The second stage 111 of the 2-stage ranging circuitry 101 may be similar to the first stage 110. The second stage 111 is coupled to the output 115 of the first stage 110 to receive the output signal therefrom as an input to the sed stage. If desired, there may be one or more additional circuits, ranging circuitry stages, or the like coupled between the first and second stages. For brevity, simplicity and convenience, though, the two ranging stages 110, 111 are shown coupled directly together, whereby the output 115 of the first stage 110 is the input to the second stage 111.

The second stage 111 includes a number of amplifiers, each having a different gain, such as, for example, x1, x10, and x100. In the illustrated embodiment, the second stage 111 has three amplifiers 120a, 120b, 120c, which are coupled in respective amplification or range setting channels, each of which includes a respective amplifier 120 and a respective switch 121a, 121b, 121c. The respective amplifiers 120 and switches 121 are coupled in parallel between the input 115 of the second stage and the output 122 thereof. The second stage 111 also includes a switch controller 123, which turns on (or of respective switches 121 based on a prescribed input to the switch controller. For example, the prescribed input to the switch controller 123 may be the signal, on the input 115 of the second stage, i.e., in the illustrated embodiment output from the first stage 110. The switch controller 123 has a number of outputs collectively indicated at 124 that operate respective switches 121 and an output 125 to provide an input to the measuring circuit, A/D 104 to indicate the range at which the second stage 111 is set.

As was described above, the source resistance and capacitance, e.g., the circuitry coupled to the input 114 of the first stage 110 of the 2-stage ranging circuit 101, and the various resistance and capacitance ms of the respective amplifier channels, which include amplifiers 112 and switches 113, for ample, may be incompatible and inconsistent. Therefore, time involved in establishing signals for measurement, the taking of measurements, and the switching of ranges may result in inaccuracies and/or inconsistencies. Therefore, the switch controller 116 switches the respective amplification channels of the first stage 110 at a speed that is relatively slow, for example sufficiently slow as to allow for the timing out of respective time constants and settling of signals for measurement. As was indicated above, the first stage 110 handles a relatively large range of signal variations or magnitudes, e.g., front x1 to x1,000,000 gain (or smaller or even larger, if desired).

However, the second stage 111 of the 2-stage ranging circuitry 101 may be faster in its switching operation than the first stage 110 and/or may have a smaller range over which gain is varied, e.g., from x1 to x100. Since the time constants associated with a smaller gain amplifier usually are shorter than the time constants associated with at least some of the larger gain amplifiers in the first stage 110, the impact on time constants and speed of measurements by the second stage 111 is less than by the first stage 110. Therefore, the second stage 111 can be switched to different ranges by the switch controller 123 faster than the gains in the first stage are switched, while still providing for accurate measurements. Furthermore, since the second stage 111 is serially connected with the first stage 110, the dynamic range of the measurement system 100 is increased relative to a measurement system with only a single stage ranging circuitry, while still being able to provide for high speed measurements. Exemplary measurements may be taken at a speed on the order of 100,000 per second while providing a dynamic range of on the order of 50 dB.

The operating gains of the two stages 110, 111 of the 2-stage ranging circuitry 101 are combined to provide a transfer function for the measurement system 100. For example, the gains in effect due to respective amplifiers 112, 120 being switched into operation by respective switch controllers 116, 123, may be multiplied to provide the transfer function and, thus, the effective gain of the 2-stage ranging circuitry. The measuring circuit, A/D 104 is in of the transfer function by the collections of respective outputs 118, 125 from the switch controllers 116, 123 to thereto, as is illustrated. Therefore, the measuring circuit, A/D 104 provides a digital output representative of the signal being provided at the input to the measurement system 100, e.g., as detected by the photosensitive diode 102.

Figure 7:
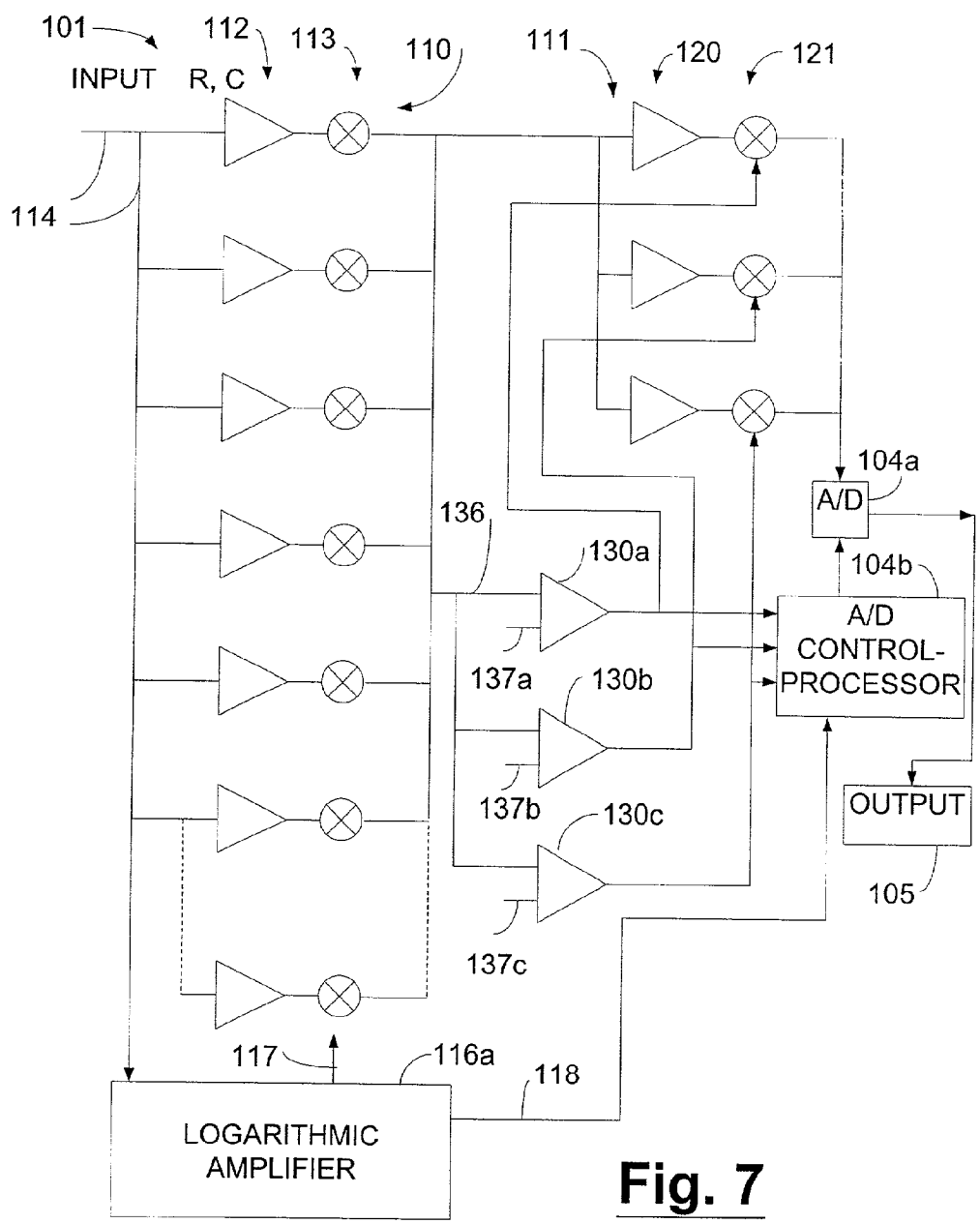
FIG. 7 is a schematic circuit diagram and block diagram illustrating the multiple stage ranging circuit of FIGS. 5 and 6 showing details of exemplary range selectors.

Turning to FIG. 7, another example of 2-stage ranging circuitry 110a is illustrated. The 2-stage ranging circuitry 101a is similar in construction and operation to the 2-stage ranging circuitry 101 described above. However, in the 2-stage ranging circuitry 110a the switch controller 116a is a logarithmic amplifier and the switch controller 123a is a number of comparators 130a, 130b, 130c. The logarithmic amplifier may function similarly to the logarithmic amplifier 23 described above, for example, with respect to the embodiment illustrated in FIG. 1; and operation of the first stage 110 of the 2-stage ranging circuitry 101 is carried out generally as was described above with respect to the description of FIGS. 5 and 6. The logarithmic amplifier switch controller 116a provides an output on respective lines, which are collectively illustrated and referred to as 117, to control respective sits 113, such as field effect transistor (FET) switches, for example; and an output is provided on line 125 to the measuring circuit, A/D 104, here illustrated as an A/D 104a and an A/D control-processor 104b.

Figure 8:
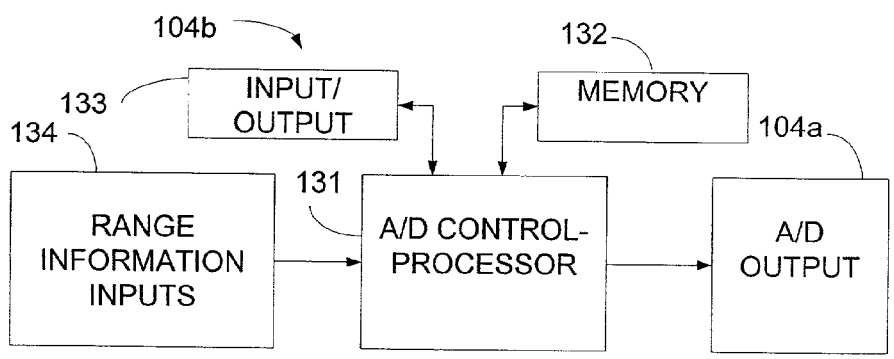
FIG. 8 is a schematic circuit diagram in block form showing a processor responsive to range information to control setting or coordination of an analog to digital converter (A/D) output device.

An example of the AID control-processor 104b is illustrated in FIG. 8, including a processor 131, such as a microprocessor, and associated programming, memory 132, input/output channels 133, etc. The A/D control-processor 104b may be a specially designed circuit, sometimes referred to as an ASIC. The AID 104a receive special inputs, as is shown at 134 in FIG. 8, from the logarithmic amplifier switch controller 116 and the comparators switch controller 123 via respective lines 118, 125, to indicate the current transfer function of the 2-agc ranging circuitry 101. This way the output information from the A/D 104a is directly representative on the appropriate scale of the input signal to the measuring system 100, e.g., from the photosensitive diode 102.

In the second stage 111, the switch controller 123 (FIG. 6) and the switch controller 123a (FIG. 7) may be a logarithmic amplifier, such as the logarithmic amplifier 116a. However as the number of ranges to be switched in the second stage 111 is relatively small and the total span of the range of the second stage and/or the range span of each amplifier 120 is relatively small, especially compared to the total span of the first stage 110 and/or of the larger gain amplifiers of the first stage, a switch controller 123a may be composed of several comparator circuits 130a, 130b, 130c, as is illustrated in FIG. 7.

Each comparator 130 has an input 136 coupled to line 115, which is the input to the second stage 111 of the 2-stage ranging circuitry 101 to monitor the signal thereon. Each comparator also has a reference signal input 137a, 137b, 137c, which is a percentage function related inversely to the gains/ranges of the amplifiers 120a, 120b, 120c, for example, 100%, 10%, and 1%, respectively, of a reference signal from a signal source, not shown. Therefore, depending on the signal on line 115, a respective comparator 135a, 135b, 135c will produce an output that will turn on a respective FET switch 121a, 121b, 121c to couple a respective amplifier 120a, 120b, 120c in circuit between line 115 and line 122. Other techniques also may be used to select which of the amplifiers 120 is to be turned on, e.g., coupled in operation by a switch 121, in the second stage 111.

Figure 9:
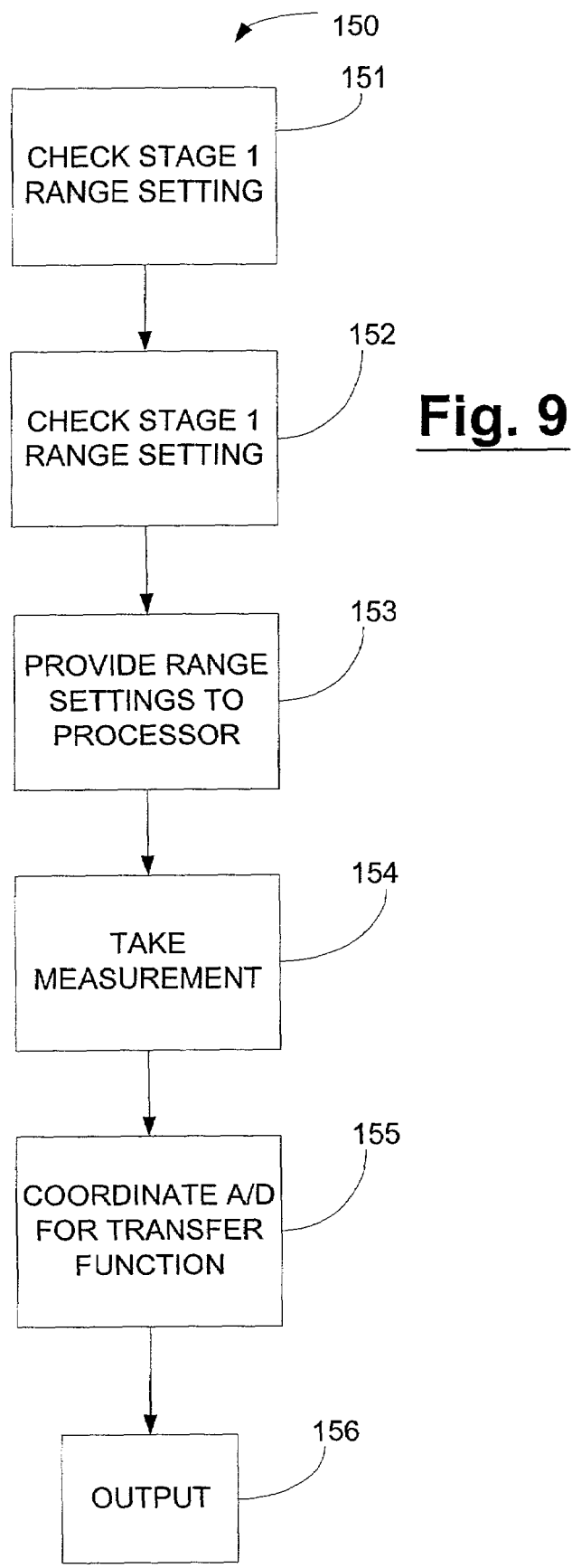
FIG. 9 is a computer program flow chart or logic diagram illustrating exemplary operation of the circuit of FIG. 8.

Referring to FIG. 9, a computer program, flow chart or logic diagram 150 is illustrated. The program 150 may be used to prepare appropriate computer program or software to operate the processor 131, for example, to carry out the measuring functions of the measuring system 100 using the 2-stage ranging circuitry 101, e.g., as is illustrated in FIGS. 7 and 8. At block 151 and 152 the first and second stages 110, 111 are checked to determine what is the range sing thereof. At block 153 the range settings are provided to the processor 130. At block 154 the A/D 104a takes a measurement by counting the analog signal provided it on line 122 and converts that analog signal to a digital signal representing the value thereof. At block 155, based on the range information obtained at blocks 151, 152 the digital signal is coordinated with the transfer function of the 2-stage ranging circuitry 101, which identifies the counted digital signal value according to the transfer function of the 2-stage ranging circuitry 101, thus indicating the real magnitude of the signal detected by the input device 102, for example.

At block 156 the digital signal is provided to the output 105 of the measurement system 100 as an indication of the detected signal by the input device 102 and for further use, as may be desired.

In the illustrated and described embodiments hereof the invention is described with respect to optical measurement instruments, such as optical power meters. However, it will be appreciated that the features of the invention may be used with other measurement systems.

INDUSTRIAL APPLICATION

The present invention may be used to measure signals over a wide dynamic range at relatively high speed.

We claim:

1. A measuring circuit, comprising
   a first ranging circuit that selectively amplifies an input signal by a respective amount according to a prescribed input, and
   a second ranging circuit that selectively amplifies an input signal by a respective amount according to a prescribed input;
   wherein the first and second ranging circuits provide output information to coordinate an analog to digital converter output with an associated transfer function for the first and second ranging circuits.

2. The measuring circuit of claim 1, wherein the prescribed input to the first ranging circuit is the magnitude of the input signal.

3. The measuring circuit of claim 1, wherein the prescribed input to the second ranging circuit is proportionally representative of an output from the first ranging circuit.

4. The measuring circuit of claim 1, wherein the speed of range selection of the second ranging circuit is faster than the speed of range selection of the first ranging circuit.

5. The measuring circuit of claim 1, wherein the ranging of the first ranging circuit is on the order of about 40 db or more.

6. The measuring circuit of claim 5, wherein the ranging of the second ranging circuit is on the order of about 20 db or more.

7. The measuring circuit of claim 1, wherein the ranging of the second ranging circuit is on the order of about 20 db or more.

8. The measuring circuit of claim 1, wherein the first ranging circuit provides an output, and the prescribed input to the second ranging circuit is the output from the first ranging circuit.

9. The measuring circuit of claim 1, wherein the first ranging circuit includes a number of amplifier stages and a range selector responsive to the input to the first ranging circuit to select a respective amplifier stage to amplify the input signal.

10. The measuring circuit of claim 9, wherein the range selector for the first ranging circuit is software based.

11. The measuring circuit of claim 9, wherein the first ranging circuit provides a first amplified output from the selected amplifier as the input to the second ranging circuit.

12. The measuring circuit of claim 11, wherein the range selector for the first ranging circuit comprises a non-linear amplifier responsive to a signal representative of the input signal to the first ranging circuit to set the range thereof.

13. The measuring circuit of claim 12, wherein the non-linear amplifier comprises a logarithmic amplifier.

14. The measuring circuit of claim 11, wherein the second ranging circuit includes a number of amplifier stages and a range selector responsive to the input to the second ranging circuit to select a respective amplifier stage to amplify the input signal thereto.

15. The measuring circuit of claim 14, wherein the range selector for the second ranging circuit comprises a plurality of comparators.

16. The measuring circuit of claim 14, further comprising an output for providing a digital output representative of the magnitude of the input to the measuring circuit.

17. The measuring circuit of claim 16, wherein the output comprises an analog to digital converter.

18. The measuring circuit of claim 1, wherein the second ranging circuit includes a number of amplifier stages and a range selector responsive to the input to the second ranging circuit to select a respective amplifier stage to amplify the input signal thereto.

19. The measuring circuit of claim 18, wherein the range selector for the second ranging circuit comprises a plurality of comparators.

20. The measuring circuit of claim 1, further comprising an optical power meter coupled to the ranging circuit to measure light.

21. The measuring circuit of claim 20, wherein the optical power meter includes an input photosensitive detector, and an output coupled to the ranging circuit to provide output information representative energy incident on the input photosensitive detector.

22. The measuring circuit of claim 1, wherein the first ranging circuit has more than three ranges.

23. The measuring circuit of claim 22, wherein the first ranging circuit has 5 or more ranges.

24. The measuring circuit of claim 23, wherein the first ranging circuit has more than 7 ranges.

25. The measuring circuit of claim 1, wherein the second ranging circuit has more than one range.

26. The measuring circuit of claim 25, wherein the second ranging circuit has three ranges.

27. The measuring circuit of claim 25, wherein the second ranging circuit has four ranges.

28. A measuring circuit, comprising
a first ranging circuit that selectively amplifies an input signal by a respective amount according to a prescribed input, wherein the first ranging circuit includes a number of amplifier stages and a range selector responsive to the input to the first ranging circuit to select a respective amplifier stage to amplify the input signal;
a second ranging circuit that selectively amplifies an input signal by a respective amount according to a prescribed input;
wherein the first ranging circuit provides a first amplified output from the selected amplifier as the input to the second ranging circuit and the second ranging circuit includes a number of amplifier stases and a range selector responsive to the input to the second ranging circuit to select a respective amplifier stage to amplify the input signal thereto; and
an output for providing a digital output representative of the magnitude of the input to the measuring circuit, wherein the output comprises an analog to digital converter, wherein the first and second ranging circuits provide to the output information representative of respective range settings for coordination of the analog to digital converter output with the transfer function of the ranging circuits.

29. A measuring circuit, comprising
a first ranging circuit that selectively amplifies an input signal by a respective amount according to a prescribed input, wherein the first ranging circuit includes a number of amplifier stages and a range selector responsive to the input to the first ranging circuit to select a respective amplifier stage to amplify the input signal;
a second ranging circuit that selectively amplifies an input signal by a respective amount according to a prescribed input;
wherein the first ranging circuit provides a first amplified output from the selected amplifier as the input to the second ranging circuit and the second ranging circuit includes a number of amplifier stases and a range selector responsive to the input to the second ranging circuit to select a respective amplifier stage to amplify the input signal thereto; and
an output for providing a digital output representative of the magnitude of the input to the measuring circuit, wherein the output comprises an analog to digital converter, including processor control of the output to respond to the output information to coordinate the analog to digital converter output with the transfer function of the ranging circuits.

30. A method of ranging for signals, comprising
directing an input signal to a first ranging stage which is responsive at one speed to set ranging over a relatively wide variation in input signal magnitudes, and
directing a signal representative of an output from the first ranging stage to a second ranging stage that is responsive at a second speed faster than the one speed to set ranging over a relatively narrower range of signal magnitudes; and
providing output information to coordinate an analog to digital converter output with an associated transfer function for the first and second ranging stages.

31. A method of increasing the dynamic range of meter ranging circuitry, comprising,
directing an input signal to a first ranging stage which selects respective ranges over a relatively wide variation in input signal magnitudes, and
directing a signal representative of an output from the first ranging stage to a further ranging stage to set ranging over a relatively narrower range of signal magnitudes; and
providing output information to coordinate an analog to digital converter output with an associated transfer function for the first and second ranging stages.

* * * * *

UNITED STATES PATENT AND TRADEMARK OFFICE
CERTIFICATE OF CORRECTION

| | | |
|---|---|---|
| PATENT NO. | : 7,062,168 B1 | |
| APPLICATION NO. | : 10/102025 | |
| DATED | : June 13, 2006 | |
| INVENTOR(S) | : Atwell et al. | |

It is certified that error appears in the above-identified patent and that said Letters Patent is hereby corrected as shown below:

Column 1, line 56, replace "low rage because the likely" with --low range because the measurement likely--.
Column 1, line 64, replace "software ranging" with --software-based ranging--.
Column 3, line 40, replace "input sign magnitudes" with --input signal magnitudes—.
Column 3, line 57, replace "ranging device" with --ranging measurement device--.
Column 4, line 23, replace "aspect ret to" with --aspect relates to--.
Column 4, line 28, replace "section circuits" with --selection circuits--.
Column 5, line 12, replace "ranging circuit of" with --ranging circuitry of--.
Column 5, line 50, replace "is antics that" with --is anticipated that--.
Column 5, line 57, replace "of sigal strengths" with --of signal strengths--.
Column 6, lines 9-10, replace "the measure circuitry" with --the measurement circuitry--.
Column 6, line 12, replace "one (1) ties the" with --one (1) times the--.
Column 6, lines 16-17, replace "using convent software" with --using conventional software--.
Column 6, line 19, replace "is illustrates in" with --is illustrated in--.
Column 6, line 26, replace "is proportionally of" with --is proportionally representative of--.
Column 6, line 30, replace "are conned in" with --are connected in--.
Column 6, lines 64-65, replace "the met software" with --the measurement software--.
Column 7, line 10, replace "signal therefom varies" with --signal therefrom varies--.
Column 8, line 8, replace "the circuitry" with --the measurement circuitry--.
Column 8, line 60, replace "a sign measuring" with --a signal measuring--.
Column 9, line 28, replace "reference 112)" with --reference numeral 112)--.
Column 9, line 33, replace "reference number 113)" with --reference numeral 113)--.

UNITED STATES PATENT AND TRADEMARK OFFICE
CERTIFICATE OF CORRECTION

PATENT NO. : 7,062,168 B1
APPLICATION NO. : 10/102025
DATED : June 13, 2006
INVENTOR(S) : Atwell et al.

It is certified that error appears in the above-identified patent and that said Letters Patent is hereby corrected as shown below:

Column 9, line 47, replace "first sage 110" with --first stage 110--.
Column 9, line 54, replace "the sed stage" with --the second stage--.
Column 10, line 4, replace "on (or of respective" with --on (or off) respective--.
Column 10, line 16, replace "capacitance ms of" with --capacitance parameters of--.
Column 10, lines 17-18, replace "for ample, may" with --for example, may--.
Column 10, line 19, replace "time involved" with --time constants involved--.
Column 10, line 28, replace "front x1 to" with --from x1 to--.
Column 10, line 57, replace "is in of" with --is informed of--.
Column 10, line 58, replace "the collections of" with --the connections of--.
Column 11, line 12, replace "respective sits 113," with --respective switches 113,--.
Column 11, line 16, replace "the AID control-processor" with --the A/D control-processor--.
Column 11, line 21, replace "The AID 104a receive" with --The A/D 104a receives--.
Column 11, line 25, replace "the 2-agc ranging" with --the 2-stage ranging--.
Column 11, line 62, replace "At block 151" with --At blocks 151--.
Column 11, line 63, replace "the range sing" with --the range setting--.
Col. 13 line 59 claim 28, line 14, replace "amplifier sases and" with --amplifier stages and --.
Col. 14 line 24 claim 29, line 14, replace "amplifier sases and" with --amplifier stages and--.

Signed and Sealed this

Nineteenth Day of September, 2006

JON W. DUDAS
*Director of the United States Patent and Trademark Office*